(12) United States Patent
He et al.

(10) Patent No.: US 11,207,949 B2
(45) Date of Patent: Dec. 28, 2021

(54) MULTI-COMPRESSOR REFRIGERANT SYSTEM

(71) Applicant: Ford Global Technologies, LLC, Dearborn, MI (US)

(72) Inventors: Jing He, Novi, MI (US); Loren John Lohmeyer, Monroe, MI (US); Manfred Koberstein, Troy, MI (US); Ranganathan Madhavan, Canton, MI (US); Craig Martin Spinneweber, Fenton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 45 days.

(21) Appl. No.: 16/736,176

(22) Filed: Jan. 7, 2020

(65) Prior Publication Data
US 2021/0206235 A1   Jul. 8, 2021

(51) Int. Cl.
*F25D 23/12* (2006.01)
*B60H 1/32* (2006.01)
*B60H 1/00* (2006.01)

(52) U.S. Cl.
CPC ....... *B60H 1/3223* (2013.01); *B60H 1/00278* (2013.01); *B60H 2001/00307* (2013.01)

(58) Field of Classification Search
CPC .............. B60H 1/3223; B60H 1/00278; B60H 2001/00307

USPC ........................................................ 62/259.2
See application file for complete search history.

(56) References Cited

U.S. PATENT DOCUMENTS

| 4,051,691 | A | 10/1977 | Dawkins |
| 7,350,368 | B2 | 4/2008 | Heberle et al. |
| 10,006,684 | B2 | 6/2018 | Connell et al. |
| 10,350,966 | B2 | 7/2019 | He et al. |
| 2005/0257545 | A1 | 11/2005 | Ziehr et al. |
| 2010/0071391 | A1 | 3/2010 | Lifson et al. |
| 2013/0014529 | A1* | 1/2013 | Minds ..................... F25B 27/00 62/235.1 |
| 2014/0202178 | A1 | 7/2014 | Trumbower |
| 2017/0349030 | A1* | 12/2017 | Miura ..................... B60K 11/04 |
| 2018/0236842 | A1* | 8/2018 | Allgaeuer .......... B60H 1/00385 |

FOREIGN PATENT DOCUMENTS

| WO | 2019031221 A1 | 2/2019 |
| WO | 2019044353 A1 | 7/2019 |

* cited by examiner

*Primary Examiner* — Davis D Hwu
(74) *Attorney, Agent, or Firm* — David Coppiellie; Price Heneveld LLP

(57) ABSTRACT

A multi-compressor refrigerant system for a vehicle including a main compressor, an auxiliary compressor fluidly coupled with the main compressor, and a chiller fluidly coupled to the main compressor and the auxiliary compressor for exchanging heat with an electronic device. At least one of the main compressor and the auxiliary compressor is operated based on a thermal load of the chiller.

19 Claims, 8 Drawing Sheets

MULTI-COMPRESSOR REFRIGERANT SYSTEM

FIELD OF THE DISCLOSURE

The present disclosure generally relates to refrigerant systems, and more particularly to refrigerant systems for a vehicle.

BACKGROUND OF THE DISCLOSURE

A vehicle typically includes a heating ventilation and air conditioning (HVAC) system for conditioning the air entering a passenger compartment of the vehicle. The HVAC system typically includes a compressor for circulating refrigerant through the HVAC system.

Vehicles may also include a chiller for exchanging heat with one or more heat-producing electronic devices (e.g., a vehicle battery).

SUMMARY OF THE DISCLOSURE

According to one aspect of the present disclosure, a vehicle including a multi-compressor refrigerant system includes a main compressor, an auxiliary compressor fluidly coupled with the main compressor, and a chiller fluidly coupled to the main compressor and the auxiliary compressor, wherein the chiller exchanges heat with a heat producing electronic device and at least one of the main compressor and the auxiliary compressor is operated based on a thermal load of the chiller.

Embodiments of the first aspect of the present disclosure can include any one or a combination of the following features:
  the main compressor and the auxiliary compressor are fluidly coupled in parallel;
  an evaporator for exchanging heat with a passenger compartment, wherein the evaporator is fluidly coupled in parallel with the chiller;
  the main compressor and the auxiliary compressor are configured to be independently controlled;
  the main compressor and the auxiliary compressor are configured to be operated simultaneously at the same speed;
  a check valve fluidly coupled with an outlet of the chiller;
  a water-cooled condenser fluidly coupled to the chiller and configured to exchange heat between the multi-compressor refrigerant system and a coolant loop, wherein the coolant loop comprises a supplemental heater; and
  an internal heat exchanger having a first refrigerant path fluidly coupled with an inlet of the evaporator and a second refrigerant path fluidly coupled with an outlet of the evaporator.

According to a second aspect of the present disclosure, a method for operating a multi-compressor refrigerant system includes providing a multi-compressor refrigerant system having a main compressor and an auxiliary compressor fluidly coupled to the main compressor. The multi-compressor refrigerant system is receiving inputs from one or more thermal load indicators, determining an overall thermal load placed on the multi-compressor refrigerant system, and operating at least one of the main compressor and the auxiliary compressor to satisfy the overall thermal load.

Embodiments of the second aspect of the present disclosure can include any one or a combination of the following features:
  the overall thermal load comprises a climate thermal load and an electronics thermal load;
  at least one of the main compressor and the auxiliary compressor is operated based on the electronics thermal load;
  the main compressor and the auxiliary compressor are operated at the same speed;
  the auxiliary compressor remains off until the overall thermal load exceeds a first cooling capacity of the multi-compressor refrigerant system; and
  the first cooling capacity of the multi-compressor refrigerant system is based on the main compressor operating at a speed relating to a maximum efficiency of the main compressor and the auxiliary compressor is off.

According to a third aspect of the present disclosure, a vehicle including a multi-compressor refrigerant system includes a refrigerant loop including a chiller loop and an evaporator loop fluidly coupled in parallel with the chiller loop. The chiller loop includes a chiller and the evaporator loop includes an evaporator. The multi-compressor refrigerant system also includes a main compressor fluidly coupled with the refrigerant loop and an auxiliary compressor fluidly coupled with the refrigerant loop.

Embodiments of the third aspect of the present disclosure can include any one or a combination of the following features:
  a heater loop configured to exchange heat with the refrigerant loop by way of a water-cooled condenser;
  the main compressor and the auxiliary compressor are each independently controllable;
  the auxiliary compressor is configured to remain off until an overall thermal load exceeds a first cooling capacity of the multi-compressor refrigerant system;
  the first cooling capacity of the multi-compressor refrigerant system is based on the main compressor operating at a speed relating to a maximum efficiency of the main compressor and the auxiliary compressor remaining off; and
  the main compressor and the auxiliary compressor are configured to operate simultaneously at the same speed.

These and other aspects, objects, and features of the present disclosure will be understood and appreciated by those skilled in the art upon studying the following specification, claims, and appended drawings.

DETAILED DESCRIPTION OF THE EMBODIMENTS

Figure 1:
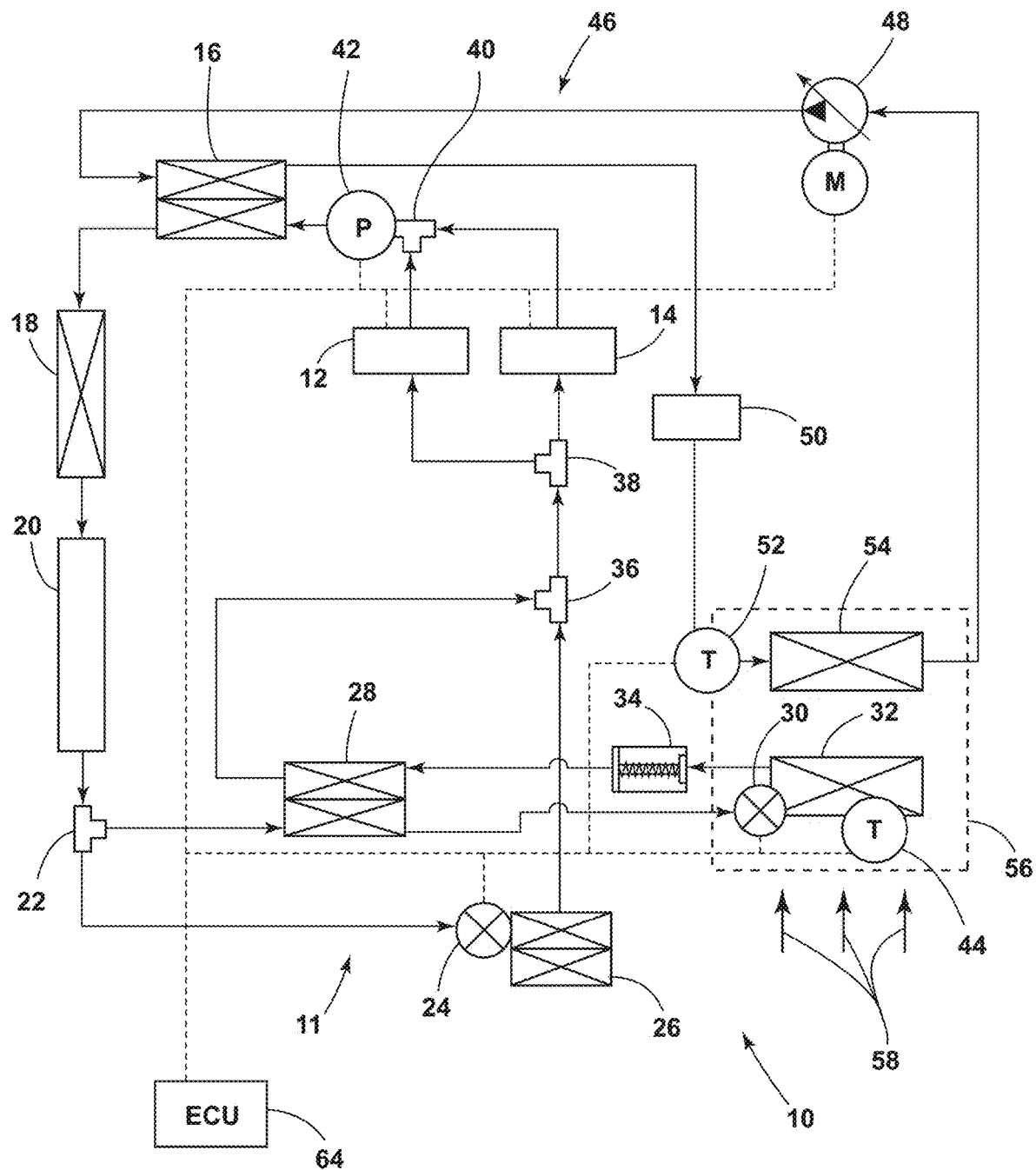
FIG. 1 is a schematic view of a multi-compressor refrigerant system according to one embodiment of the present disclosure.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIGS. 1-8, a multi-compressor refrigerant system 10 for a vehicle is provided. In various examples, the vehicle is a wheeled motor vehicle, which may be a sedan, a sport utility vehicle, a truck, a van, a crossover, and/or other styles of the vehicle. The vehicle may be a manually operated vehicle (e.g., with a human driver), a fully autonomous vehicle (e.g., no human driver), or a partially autonomous vehicle (e.g., may be operated with or without a human driver). Additionally, the vehicle may be utilized for personal and/or commercial purposes, such as ride-providing services (e.g., chauffeuring) and/or ride-sharing services.

The multi-compressor refrigerant system 10 includes a refrigerant loop 11 and a heater loop 46. The refrigerant loop 11 includes a main compressor 12 and auxiliary compressor 14 for circulating refrigerant through the refrigerant loop 11. The refrigerant loop 11 further includes a water-cooled condenser 16 configured to exchange heat between the refrigerant of the refrigerant loop 11 and a coolant of a heater loop 46 configured to provide heat to a passenger compartment of the vehicle. The refrigerant loop 11 further includes a chiller 26 for exchanging heat between the refrigerant of the refrigerant loop 11 and at least one heat-producing electronic device (e.g., high-voltage batteries, LIDAR systems, infotainment systems, electronic control units, power inverters, and combinations thereof). Additionally, the refrigerant loop 11 includes an evaporator 32 configured to exchange heat with air entering the passenger compartment of the vehicle.

Referring to FIG. 1, the multi-compressor refrigerant system 10 includes the refrigerant loop 11 and the heater loop 46. The refrigerant loop 11 further includes a chiller loop and an evaporator loop fluidly coupled in parallel. The chiller loop is configured to direct the flow of refrigerant from the main compressor 12 and/or the auxiliary compressor 14 through the chiller 26 for cooling the one or more heat-producing electronic devices. The evaporator loop is configured to direct the flow of refrigerant from the main compressor 12 and/or the auxiliary compressor 14 through the evaporator 32 for cooling the passenger compartment of the vehicle.

The refrigerant loop 11 includes the main compressor 12 and auxiliary compressor 14 for circulating refrigerant through the refrigerant loop 11. In a preferred embodiment, the main compressor 12 and/or the auxiliary compressor 14 are driven by an electric motor; however, in some embodiments, the main compressor 12 and/or the auxiliary compressor 14 may be driven mechanically (e.g., a belt-driven compressor powered by a combustion engine). In embodiments where the main compressor 12 and/or the auxiliary compressor 14 are driven mechanically, the main compressor 12 and/or the auxiliary compressor 14 may have variable flow rates (e.g., via adjustments in duty cycle and/or compressor displacement) such that the flow of refrigerant through the compressors may be increased/decreased to satisfy the cooling demands of the system. In some embodiments, the auxiliary compressor 14 includes a plurality of compressors. In some embodiments, the auxiliary compressor 14 is configured to operate simultaneously with the main compressor 12.

The refrigerant from the main compressor 12 and the auxiliary compressor 14 is combined at fitting 40 and is directed to the water-cooled condenser 16. Typically, the water-cooled condenser 16 is a refrigerant-to-coolant heat exchanger configured to exchange heat between the refrigerant and the coolant of the heater loop 46. In various embodiments, the water-cooled condenser 16 can be any suitable device for exchanging heat between two contained fluids (e.g., a plate heat exchanger or a shell-and-tube heat exchanger).

The refrigerant is directed from the water-cooled condenser 16 to a condenser 18 to exchange heat from the refrigerant with an outside environment. In a preferred embodiment, the condenser 18 is a refrigerant-to-air heat exchanger for exchanging heat directly with the environment. In some embodiments, where the condenser 18 is a refrigerant-to-air heat exchanger, the condenser 18 may be positioned on the vehicle in a position (e.g., in a front portion of the vehicle) likely to direct outside air over an exterior surface of the condenser 18. The vehicle may additionally include an air guide for directing air over the exterior surface of the condenser 18. For example, in some embodiments, the condenser 18 is a tube-and-fin heat exchanger positioned behind a front grille of the vehicle, and the vehicle includes the air guide disposed around the edges of the grille and between the grille and the condenser 18 for directing outside air over an exterior surface of the condenser 18 while the vehicle is in motion. In some embodiments, the air guide includes shutters that can be closed when heat exchange between the refrigerant and the environment is not desired. In some embodiments, the vehicle further includes a cooling fan positioned proximate the condenser 18 for directing air over the exterior surface of the condenser 18.

In some embodiments, the condenser 18 may be a refrigerant-to-coolant heat exchanger (e.g., a water-cooled condenser) to exchange heat with the outside air through one or more heat exchange mediums (e.g., an ethylene glycol solution) and one or more additional heat exchangers. In such examples, the condenser 18 may be any suitable structure for exchanging heat between two contained fluids (e.g., a plate heat exchanger or a shell and tube heat exchanger). In some examples, the condenser 18 may be part of an additional heat exchange cycle or loop for exchanging heat with one or more components of the vehicle.

In some embodiments, a receiver-drier 20 is provided in the refrigerant loop 11. The receiver-drier 20 is configured to store excess refrigerant and separate vapor refrigerant from liquid refrigerant. Typically, the receiver-drier 20 includes a desiccant for removing moisture from the refrigerant loop 11 and a filter for trapping debris from the refrigerant loop 11.

Figure 7:
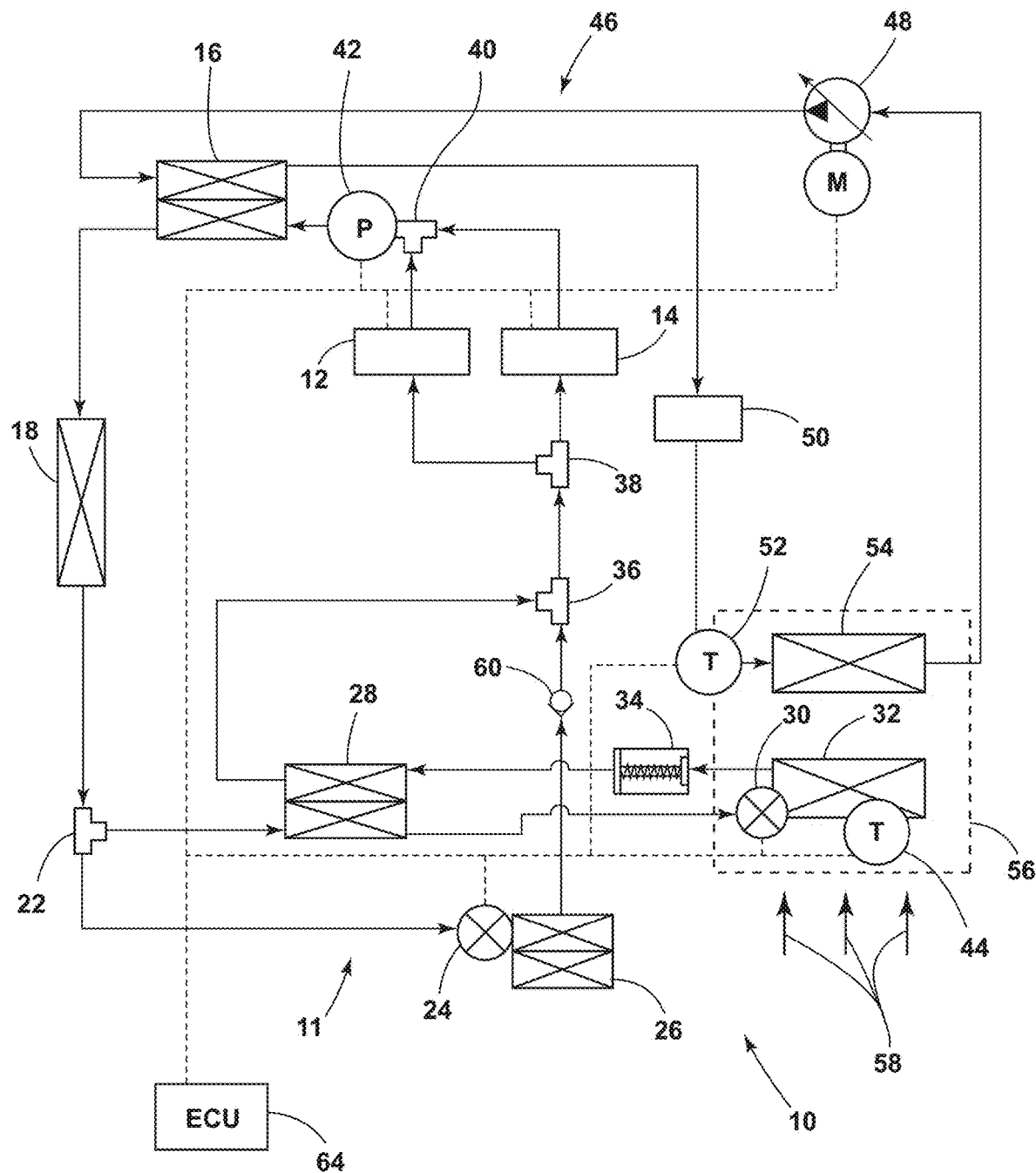
FIG. 7 is a schematic view of a multi-compressor refrigerant system according to one embodiment of the present disclosure.
Figure 8:
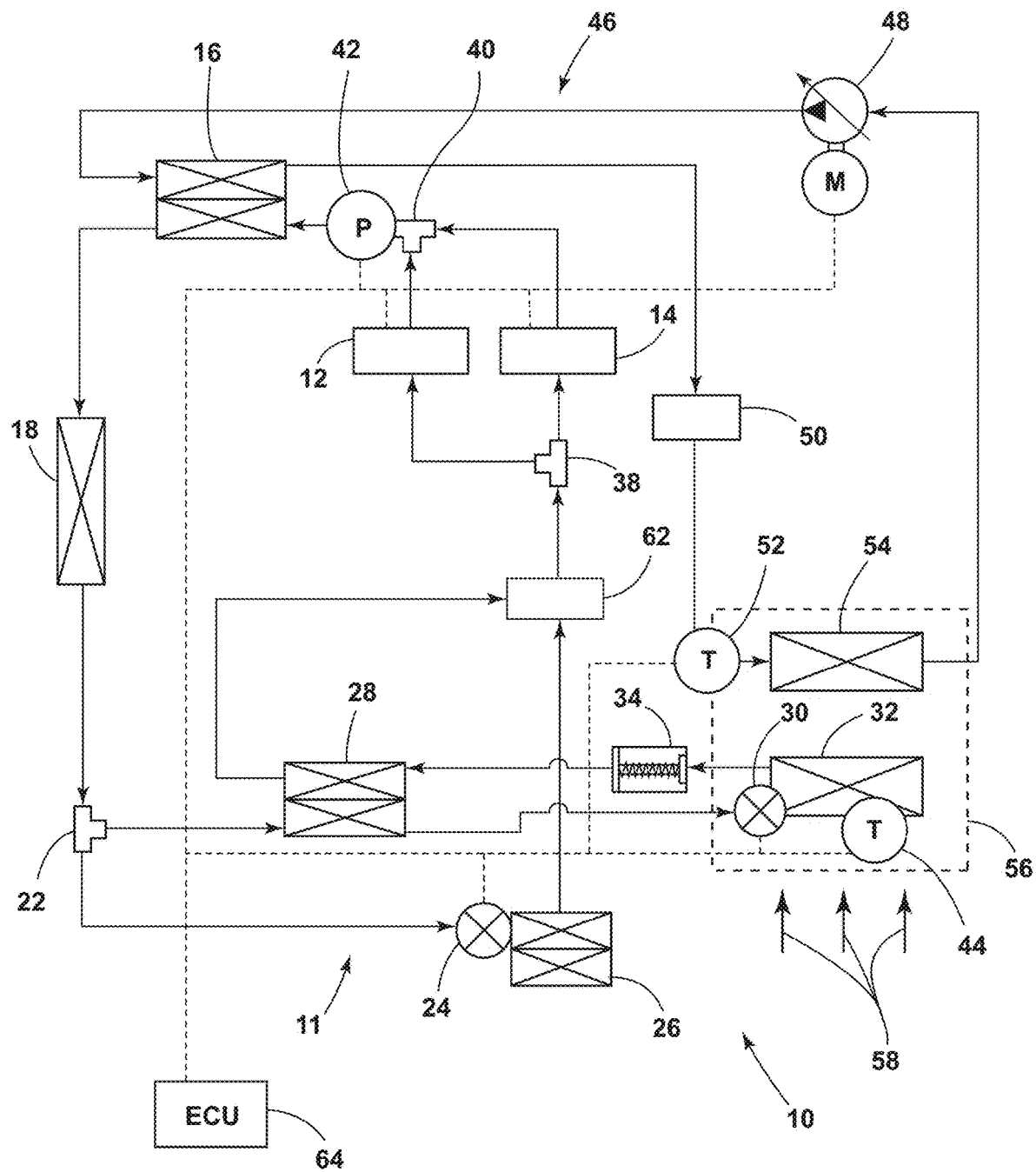
FIG. 8 is a schematic view of a multi-compressor refrigerant system according to one embodiment of the present disclosure.

In some embodiments, the receiver-drier 20 is integrated with the condenser 18 (FIG. 7). In some embodiments, the receiver-drier may be replaced with an accumulator 62 (FIG. 8).

A fitting 22 is included in the refrigerant loop 11 for directing the refrigerant to the chiller and/or the evaporator. In some embodiments, the fitting 22 is a T-fitting. In other embodiments, the fitting 22 may be a three-way valve for selectively directing the flow of refrigerant through the chiller loop and/or evaporator loop From the fitting 22, the refrigerant may be split into a first portion of refrigerant and a second portion of refrigerant. The first portion of refrigerant may be directed to a chiller expansion device 24. The chiller expansion device 24 may be used for decreasing the pressure/temperature of the first portion of refrigerant prior to entering the chiller 26. Suitable expansion devices may include, but are not limited to, thermal expansion valves, manual expansion valves, capillary tubes, automatic valves, electronic expansion valves, and float valves. In some embodiments, the chiller expansion device 24 is an electronic expansion valve. In some embodiments, the chiller expansion device 24 may be a thermal expansion valve with a sensing bulb disposed downstream from the chiller 26 for maintaining a desired superheat. Additionally, in some embodiments, the chiller expansion device 24 is capable of being fully closed to prevent the flow of the first portion of refrigerant through the chiller 26 when cooling of the heat-producing electronic device is not needed and/or desired.

The first portion of refrigerant is directed from the chiller expansion device 24 to the chiller 26. Typically, the chiller 26 is a refrigerant-to-coolant heat exchanger for cooling a coolant from a coolant loop. Typically, the chiller 26 is a plate heat exchanger, but other suitable heat exchangers (e.g., shell-and-tube heat exchangers) are contemplated. In various embodiments, the first portion of refrigerant may be selectively directed to the chiller 26 based on a variety of factors including, but not limited to, a request cooling for the passenger cabin, temperatures for the one or more heat-producing electronic devices exceeding desired limits, towing status of the vehicle, battery charging status, and combinations thereof.

The second portion of refrigerant may be directed from the fitting 22 to a high-temperature side of an internal heat exchanger 28. The internal heat exchanger 28 is configured to exchange heat between a high-temperature liquid refrigerant from the condenser 18 and a low-temperature vapor refrigerant leaving the evaporator 32. The internal heat exchanger 28 further cools the high-temperature liquid refrigerant thereby increasing the cooling capacity of the refrigerant loop 11. At the same time, the internal heat exchanger 28 further heats the low-temperature vapor refrigerant thereby helping to reduce the likelihood of particles of liquid refrigerant entering the main compressor 12 and/or the auxiliary compressor 14. Accordingly, the internal heat exchanger 28 helps to prevent damage to the main compressor 12 and/or the auxiliary compressor 14 and helps to increase the efficiency of the refrigerant loop 11.

The second portion of refrigerant is directed to an evaporator expansion device 30. The evaporator expansion device 30 is used for decreasing the pressure of the second portion of refrigerant prior to entering the evaporator 32. Suitable expansion devices may include, but are not limited to, thermal expansion valves, manual expansion valves, capillary tubes, automatic valves, electronic expansion valves, and float valves. In some embodiments, the evaporator expansion device 30 is an electronic expansion valve. In some embodiments, the evaporator expansion device 30 may be a thermal expansion valve with a sensing bulb disposed downstream from the evaporator 32 for maintaining a desired superheat. Additionally, in some embodiments, the evaporator expansion device 30 is capable of being fully closed to prevent the flow of the first portion of refrigerant through the evaporator 32 when cooling of the passenger compartment is not needed and/or desired.

The evaporator 32 exchanges heat with the passenger compartment of the vehicle. Typically, the evaporator 32 is a refrigerant-to-air heat exchanger positioned within a mixing chamber of an HVAC case 56 for exchanging heat directly with intake air 58 entering the passenger compartment of the vehicle. However, it is contemplated that, in some embodiments, the evaporator 32 could exchange heat with the intake air 58 via a coolant loop and additional heat exchangers.

An evaporator pressure regulator 34 may be positioned on an outlet side of the evaporator 32 for maintaining a desired pressure (e.g., a pressure corresponding to a temperature above a freezing point of the evaporator 32) of the refrigerant in the evaporator 32. Typically, the evaporator pressure regulator 34 is a mechanical device with a valve having a predetermined force (e.g., via a spring) biasing the valve toward a closed position. Provided that the pressure of the refrigerant from the evaporator 32 exceeds the desired pressure, the valve is opened and the refrigerant flows through the evaporator pressure regulator 34. By maintaining the pressure of the refrigerant within the evaporator 32 above the desired pressure, the evaporator pressure regulator 34 maintains the evaporator 32 above a desired temperature and helps to prevent the build-up of ice on the exterior surface of the evaporator 32. Accordingly, the first portion of refrigerant flowing through the chiller 26 can be maintained at a lower pressure/temperature, thereby increasing the cooling capacity of the chiller 26.

From the evaporator pressure regulator 34, the second portion of the refrigerant flows through the low-temperature side of the internal heat exchanger 28 and exchanges heat with the refrigerant flowing through the high-temperature side of the internal heat exchanger 28 as discussed above. The second portion of refrigerant is then directed to fitting 36 where the second portion of the refrigerant is combined with the first portion of refrigerant. The refrigerant is then directed to fitting 38 where the refrigerant may be split and directed back to the main compressor 12 and/or the auxiliary compressor 14.

Typically, the multi-compressor refrigerant system 10 includes one or more sensors for detecting various properties of the refrigerant flowing through the refrigerant loop 11. A refrigerant pressure sensor 42 may be included for measuring the pressure of the refrigerant. In the shown embodiment, the refrigerant pressure sensor 42 is positioned downstream from the main compressor 12 and the auxiliary compressor 14 to provide a saturation pressure reading for the refrigerant loop 11. In a non-limiting embodiment, the main compressor 12 and/or the auxiliary compressor 14 are operated based on the received pressure reading from the refrigerant pressure sensor 42. In some embodiments, the refrigerant loop 11 includes a fin thermistor 44 configured to provide a temperature reading corresponding to a temperature of the exterior surface of the evaporator 32. In a non-limiting embodiment, the speed of the main compressor 12 and/or the auxiliary compressor 14 is modified based on the temperature reading received from the fin thermistor 44.

The heater loop 46 is configured to exchange heat with the refrigerant loop 11 and further exchange heat with the intake air 58 entering the passenger compartment of the vehicle via a heater core 54. The heater loop 46 includes a pump 48 for circulating coolant through the heater loop 46. Typically, the pump 48 is driven by an electric motor, however, it is contemplated that the pump 48 could be mechanically driven (e.g., by an internal combustion engine of a plug-in hybrid electric vehicle). Typically, the pump 48 includes a variable flow rate and may be shut off when heating the passenger compartment of the vehicle is not needed and/or desired.

As discussed with regard to the refrigerant loop 11, the coolant of the heater loop 46 can be heated by the refrigerant of the refrigerant loop 11 via the water-cooled condenser 16. In some embodiments, the heater loop 46 includes a supplemental heater 50 for providing additional heat to the coolant of the heater loop 46. Typically, the supplemental heater 50 is a liquid positive temperature coefficient ("PTC") heater, however, any suitable device for providing additional heat to the coolant loop is contemplated.

The heater loop 46 may include a coolant temperature sensor 52. Typically, the coolant temperature sensor 52 provides a temperature reading corresponding to a temperature of the coolant in the heater loop 46 to an electronic control unit (ECU) 64. In some embodiments, the pump 48 and/or the supplemental heater 50 are activated based on the temperature reading received from the coolant temperature sensor 52 for maintaining a desired temperature of the coolant in the heater loop 46.

The heater loop 46 further includes a heater core 54. In some embodiments, the heater core 54 is a coolant-to-air heat exchanger (e.g., a tube-and-fin heat exchanger) positioned within a mixing chamber of the HVAC case 56 for exchanging heat between the coolant and the intake air 58 entering the passenger compartment of the vehicle.

The ECU 64 for receiving inputs and controlling the various components of the multi-compressor refrigerant system 10. In the shown embodiment, the ECU 64 is configured to receive inputs from the various sensors 42, 44, and 52 as well as control the various components 12, 14, 24, and 30 of the multi-compressor refrigerant system 10. In some embodiments, the ECU 64 is configured to receive inputs from additional devices including, but not limited to, climate controls for receiving user inputs, solar sensors, vent temperature sensors, passenger compartment temperature sensors, ambient air temperature sensors, temperature sensors for various heat-producing electronic devices, vehicle speed sensors, and combinations thereof. Additionally, in various embodiments, the ECU 64 is configured to control various vehicle components including, but not limited to, expansion devices, compressors, pumps, air-guide shutters, air distribution flaps for directing air through the HVAC case 56, valves, blower motors for propelling the intake air 58 through the HVAC case 56, and combinations thereof. In some embodiments, the ECU 64 is a plurality of electronic control units.

Figure 2:
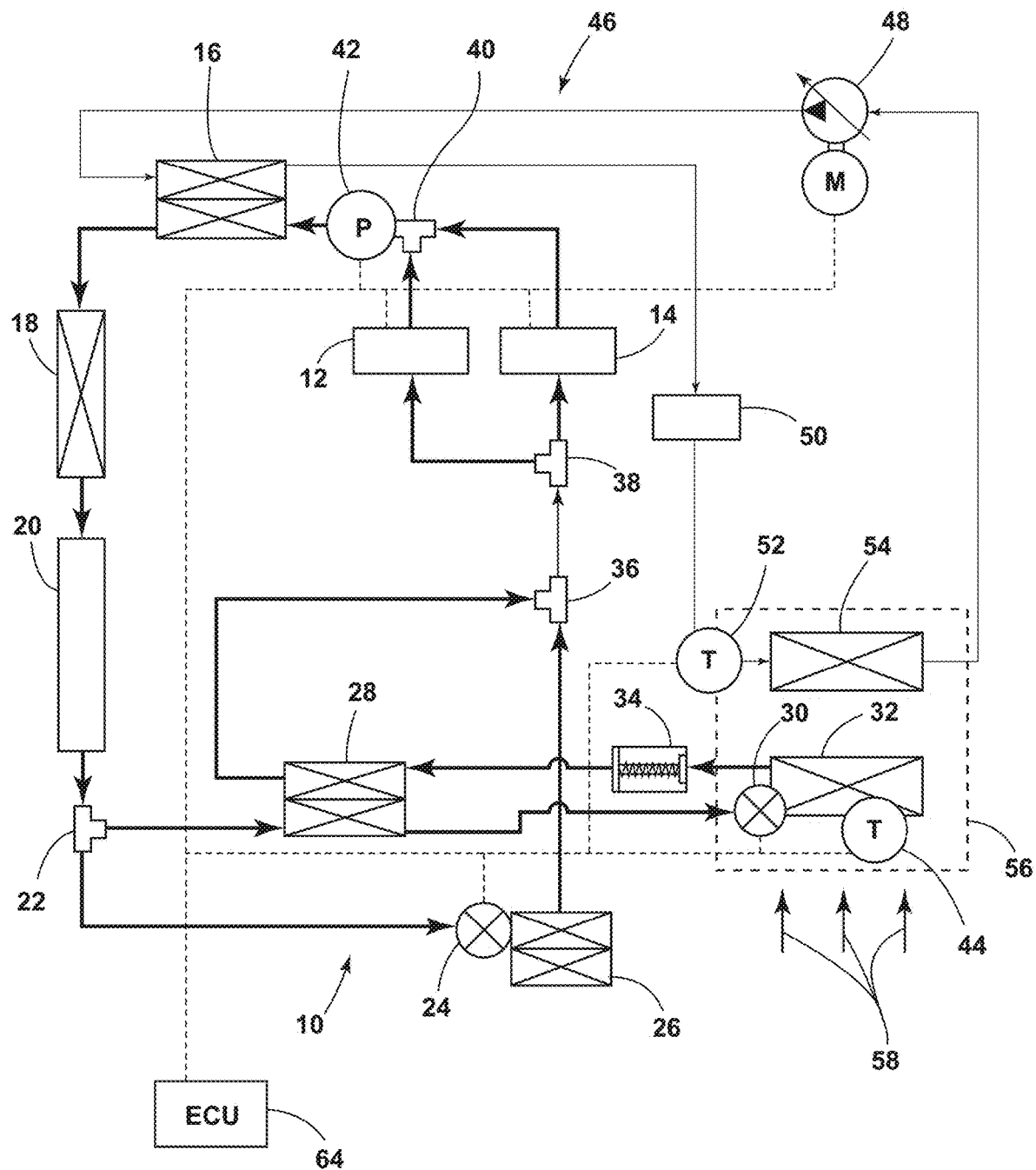
FIG. 2 is a schematic view of the multi-compressor refrigerant system of FIG. 1 with the multi-compressor refrigerant system operating in a cooling mode.

Referring now to FIG. 2, an exemplary cooling mode of the multi-compressor refrigerant system 10 is provided. While operating in the cooling mode, the refrigerant in the refrigerant loop 11 is directed through the evaporator loop for cooling the intake air 58 entering the passenger compartment of the vehicle. Where cooling of the at least one heat-producing electronic device is desired, the refrigerant is also directed through the chiller loop to provide cooling to the at least one heat-producing electronic device. While operating with refrigerant flowing through both the evaporator loop and the chiller loop, the evaporator 32 may operate at a higher temperature (e.g., 6.5 degrees Celsius; hence higher pressure) as compared to the chiller 26, which may operate at a lower temperature (e.g., 0 degrees Celsius; hence lower pressure) due to the additional pressure loss across the evaporator pressure regulator 34.

Typically, while operating in the cooling mode, the heater loop 46 is deactivated. In some embodiments, the heater loop 46 is deactivated by disabling the pump 48. In some embodiments, temperature blend doors in the HVAC case 56 may be positioned such that the intake air 58 does not flow over an exterior surface the heater core 54 such that the coolant may still flow through the heater core 54 without heating the passenger compartment of the vehicle.

Figure 3:
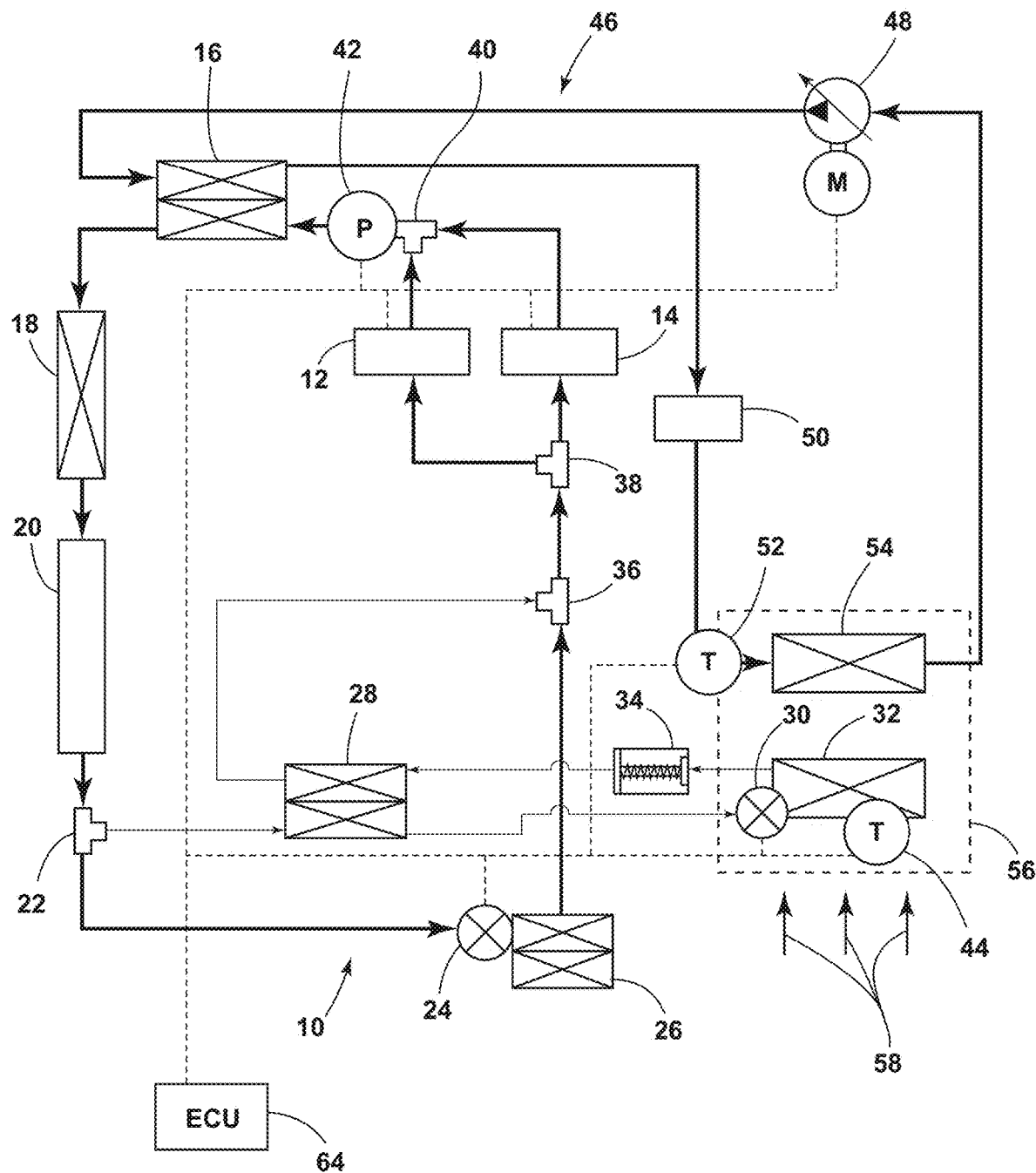
FIG. 3 is a schematic view of the multi-compressor refrigerant system of FIG. 1 with the multi-compressor refrigerant system operating in a heating mode with waste heat recovery from one or more heat-producing devices.

Referring now to FIG. 3, an exemplary heating mode of the multi-compressor refrigerant system 10 is provided with waste heat recovery from one or more heat-producing devices by way of the chiller. While operating in this heating mode, the refrigerant in the refrigerant loop 11 is prevented from flowing through the evaporator loop such that the refrigerant flows only through the chiller loop. Additionally, the pump 48 of the heater loop 46 is active such that heat from the refrigerant of the refrigerant loop 11 is exchanged via the water-cooled condenser 16 to the coolant of the heater loop 46. In some embodiments, the shutters of the air guide are closed and the cooling fan is disabled while the multi-compressor refrigerant system 10 is operating in the heating mode to reduce the exchange of heat between the refrigerant and the environment via the condenser 18. According to various aspects, the supplemental heater 50 may be activated to achieve a target coolant temperature flowing into the heater core 54.

Figure 4:
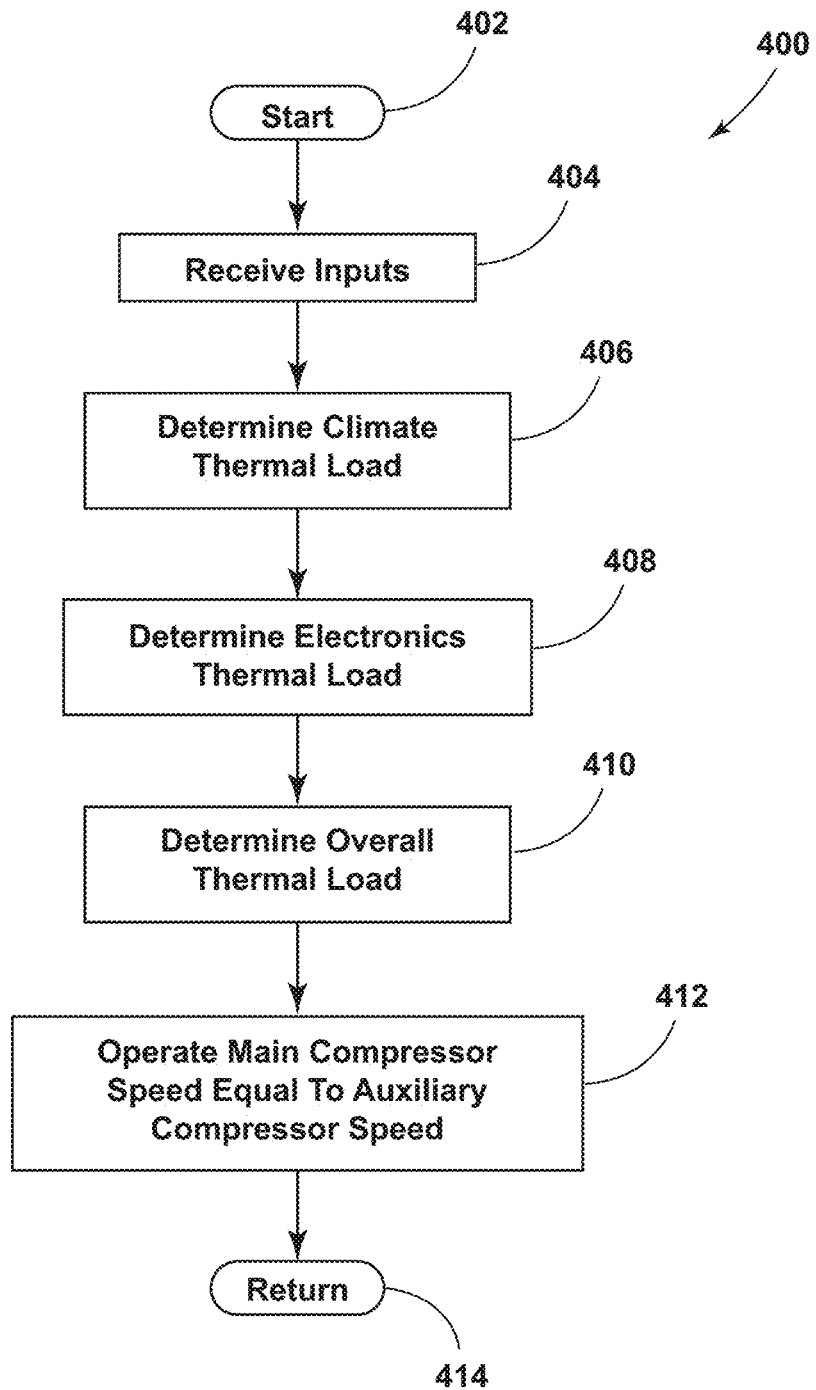
FIG. 4 is a flow diagram of a method for operating a multi-compressor refrigerant system according to one embodiment of the present disclosure.

Referring now to FIG. 4, a method 400 for operating the main compressor 12 and/or the auxiliary compressor 14 is provided. In some embodiments, the method 400 is initiated (operation 402) by a climate control system. Typically, the climate control system includes at least one ECU 64 (e.g., a climate control module) for receiving inputs and controlling the various components of the multi-compressor refrigerant system 10. The climate control system receives inputs (operation 404) from one or more indicators relating to a climate thermal load and/or an electronics thermal load. Exemplary indicators relating to the climate thermal load include, but are not limited to, a desired temperature set point of the passenger compartment, an ambient temperature reading, a passenger compartment temperature reading, and a reading from a sun load sensor relating to the intensity and/or direction of radiant heat impinging the vehicle from the sun, and combinations thereof. Exemplary indicators relating to the electronics thermal load include, but are not limited to, temperature readings related to various electronic devices (e.g., a high-voltage battery), charge state of the battery, charging status of the battery, vehicle towing indicators, uphill driving indicators, and combinations thereof.

Using the received inputs, the climate control system determines a climate thermal load (operation 406) and an electronics thermal load (operation 408). The climate thermal load and the electronics thermal load can be used to calculate an overall thermal load (operation 410). The main compressor 12 and the auxiliary compressor 14 are then operated equally at a speed sufficient to satisfy the overall thermal load placed on the multi-compressor refrigerant system 10 (FIG. 1). In some embodiments, the method 400 is reiterative (operation 414) such that the thermal loads being placed on the multi-compressor refrigerant system 10 are recurrently monitored and the speed of the main compressor 12 and/or the auxiliary compressor 14 are adjusted to accommodate the variation of thermal loads placed on the multi-compressor refrigerant system 10.

Figure 5:
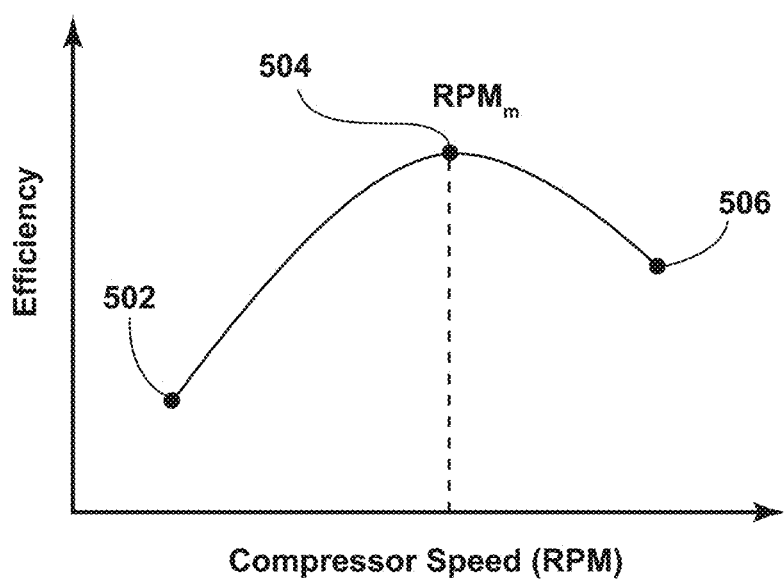
FIG. 5 is a graph of an illustrative efficiency curve for a compressor according to one embodiment of the present disclosure.

Referring now to FIG. 5, an illustrative efficiency curve corresponding to the main compressor 12 and/or the auxiliary compressor 14 is provided. Typically, the efficiency of the main compressor 12 and/or the auxiliary compressor 14 varies in relation to the speed at which the main compressor 12 and/or the auxiliary compressor 14 is operating. Typically, as the speed of the main compressor 12 and/or the auxiliary compressor 14 increases from a lower limit 502, the efficiency increases until the speed reaches a speed of maximum efficiency 504. As the speed of the main compressor 12 and/or the auxiliary compressor 14 continues to increase the efficiency declines until the speed reaches an upper limit 506 of the operable range of speeds of the main compressor 12 and/or the auxiliary compressor 14.

Figure 6:
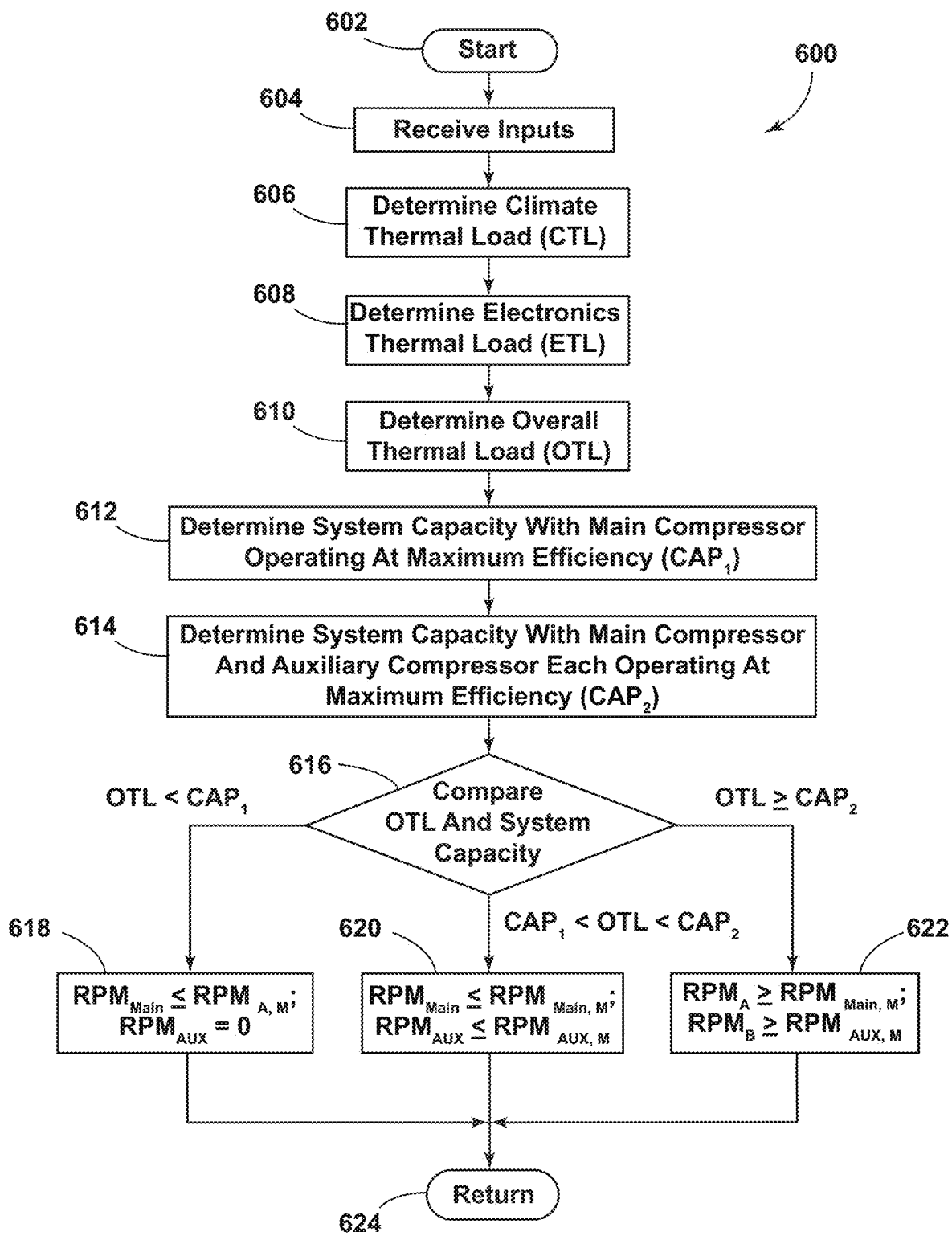
FIG. 6 is a flow diagram of a method for operating a multi-compressor refrigerant system according to one embodiment of the present disclosure.

Referring now to FIGS. 5 and 6, a method 600 for operating the multi-compressor refrigerant system 10 in response to the efficiency of the main compressor 12 and/or the auxiliary compressor 14 is provided. Typically, as shown in FIG. 5, the efficiency of the main compressor 12 and/or the auxiliary compressor 14 in relation to the speed of the main compressor 12 and/or the auxiliary compressor 14 is known. Accordingly, in some embodiments, the main compressor 12 and/or the auxiliary compressor 14 can be operated such that the combined efficiency of the main compressor 12 and the auxiliary compressor 14 is increased.

In some embodiments, the method 600 is initiated (operation 602) by a climate control system. Typically, the climate control system includes at least one ECU 64 (e.g., a climate control module) for receiving inputs and controlling the various components of the multi-compressor refrigerant system 10. The climate control system receives inputs (operation 604) from one or more indicators relating to a climate thermal load and/or an electronics thermal load. Exemplary indicators relating to the climate thermal load include, but are not limited to, a desired temperature set point of the passenger compartment, an ambient temperature reading, a passenger compartment temperature reading, and a reading from a sun load sensor relating to the intensity and/or direction of radiant heat impinging the vehicle from the sun, and combinations thereof. Exemplary indicators relating to the electronics thermal load include, but are not limited to, temperature readings related to various electronic devices (e.g., a high-voltage battery), charge state of the battery, charging status of the battery, vehicle towing indicators, uphill driving indicators, and combinations thereof.

Using the received inputs, the climate control system determines a climate thermal load (operation 606) and an electronics thermal load (operation 608). The climate thermal load and the electronics thermal load are used to calculate an overall thermal load (operation 610). A first cooling capacity of the multi-compressor refrigerant system 10 is determined relating to the main compressor 12 operating at the speed of maximum efficiency 504 and the auxiliary compressor 14 shut off (operation 612). A second cooling capacity of the multi-compressor refrigerant system 10 is determined relating to the main compressor 12 operating at the speed of maximum efficiency 504 and the auxiliary compressor 14 operating at the speed of maximum efficiency 504 (operation 614).

The overall thermal load is then compared with the first cooling capacity and second cooling capacity of the multi-compressor refrigerant system 10 (operation 616). If the overall thermal load is less than or equal to the first cooling capacity, the main compressor 12 is operated at or below the speed of maximum efficiency 504 and the auxiliary compressor 14 remains off (operation 618). If the overall thermal load is greater than the first cooling capacity, but less than or equal to the second cooling capacity, the main compressor 12 and auxiliary compressor 14 are each operated at or below the speed of maximum efficiency 504 (operation 620). In some embodiments, when the overall thermal load exceeds the first cooling capacity of the multi-compressor refrigerant system 10, the main compressor 12 and the auxiliary compressor 14 are operated at the same speed. If the overall thermal load exceeds the second cooling capacity of the multi-compressor refrigerant system 10, the main compressor 12 and the auxiliary compressor 14 are each operated at or above the speed of maximum efficiency 504. In some embodiments, the method 600 is reiterative (operation 624) such that the thermal loads being placed on the multi-compressor refrigerant system 10 are recurrently monitored and the speed of the main compressor 12 and/or the auxiliary compressor 14 are adjusted to accommodate the variation of thermal loads placed on the multi-compressor refrigerant system 10. In some embodiments, at least one of the main compressor 12 and the auxiliary compressor 14 is operated based on one or more of any of the received inputs for calculating the climate thermal load and the electronics thermal load.

Referring now to FIG. 7, in some embodiments, the condenser 18 includes an integrated receiver-drier 20 and the refrigerant loop 11 includes at least one check valve 60 for preventing the backflow of refrigerant in the multi-compressor refrigerant system 10. As shown, the at least one check valve 60 is positioned proximal the chiller 26 for preventing the backflow of refrigerant into the chiller 26 from the fitting 36. In various embodiments, it is contemplated that the at least one check valve 60 may be positioned at any point in the multi-compressor refrigerant system 10. In preferred embodiments, the at least one check valve 60 may be positioned on any of a plurality of parallel flow paths (e.g., the chiller loop and the evaporator loop) within the multi-compressor refrigerant system 10 to prevent the back flow of refrigerant between parallel flow paths having dissimilar pressures.

Referring now to FIG. 8, in some embodiments, the multi-compressor refrigerant system 10 includes an accumulator 62 instead of the receiver-drier 20. In some embodiments, the accumulator 62 is provided to store excess refrigerant and avoid excessive liquid refrigerant from entering the main compressor 12 and/or the auxiliary compressor 14 to prevent damage to the main compressor 12 and/or the auxiliary compressor 14. Typically, the accumulator 62 includes a desiccant for removing water from the refrigerant loop 11 and a filter for trapping debris from refrigerant loop 11. In the shown embodiment, the accumulator 62 also serves to combine the first portion of refrigerant from the chiller loop and the second portion of refrigerant from the evaporator loop.

The disclosed embodiments include several advantages. The incorporation of multiple compressors provides the multi-compressor refrigerant system 10 with increased cooling capacity in comparison with traditional systems while still enabling the system to satisfy smaller cooling demands efficiently. More specifically, by incorporating multiple compressors, the multi-compressor refrigerant system 10 is able to satisfy the demands of the HVAC system as well as the increasing demands of the various electrical components as the capabilities, and corresponding cooling demands, of electric vehicles, increase. The disclosed embodiments also provide increased efficiency as the main compressor 12 and the auxiliary compressor 14 generally operate at more efficient speeds than would the larger compressor of a single compressor system. Additionally, adding multiple compressors to the system introduces a degree of redundancy thereby decreasing deviations and/or fluctuations in the cooling performance of the system.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or moveable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A multi-compressor refrigerant system for a vehicle comprising:
   a main compressor;
   an auxiliary compressor fluidly coupled with the main compressor, wherein the main compressor and the auxiliary compressor are fluidly coupled in parallel;
   a chiller fluidly coupled to the main compressor and the auxiliary compressor, wherein the chiller exchanges heat with a heat producing electronic device and at least one of the main compressor and the auxiliary compressor is operated based on a thermal load of the chiller; and
   a controller controlling the main compressor and the auxiliary compressor to operate only the main compressor when the thermal load is less than a first threshold, to operate the main and auxiliary compressors at or below a maximum efficiency when the thermal load is between the first threshold and a greater second threshold, and to operate the main and auxiliary compressors at or above the maximum efficiency when the thermal load exceeds the second threshold.

2. The multi-compressor refrigerant system of claim 1, further comprising an evaporator for exchanging heat with a passenger compartment, wherein the evaporator is fluidly coupled in parallel with the chiller.

3. The multi-compressor refrigerant system of claim 1, wherein the main compressor and the auxiliary compressor are configured to be independently controlled.

4. The multi-compressor refrigerant system of claim 1, wherein the main compressor and the auxiliary compressor are configured to be operated simultaneously at the same speed.

5. The multi-compressor refrigerant system of claim 1, further comprising a check valve fluidly coupled with an outlet of the chiller.

6. The multi-compressor refrigerant system of claim 1, further comprising a water-cooled condenser fluidly coupled to the chiller and configured to exchange heat between the multi-compressor refrigerant system and a coolant loop, wherein the coolant loop comprises a supplemental heater.

7. The multi-compressor refrigerant system of claim 2, further comprising an internal heat exchanger having a first refrigerant path fluidly coupled with an inlet of the evaporator and a second refrigerant path fluidly coupled with an outlet of the evaporator.

8. A method for operating a multi-compressor refrigerant system in a vehicle comprising:
   providing a multi-compressor refrigerant system having a main compressor and an auxiliary compressor fluidly coupled to the main compressor;
   receiving inputs from one or more thermal load indicators;
   determining an overall thermal load placed on the multi-compressor refrigerant system, wherein the overall thermal load comprises a climate thermal load of a passenger compartment in the vehicle and an electronics thermal load;
   operating at least one of the main compressor and the auxiliary compressor to satisfy the overall thermal load; and
   controlling the main compressor and the auxiliary compressor with a controller to operate only the main compressor when the thermal load is less than a first threshold, to operate the main and auxiliary compressors at or below a maximum efficiency when the thermal load is between the first threshold and a greater second threshold, and to operate the main and auxiliary compressors at or above the maximum efficiency when the thermal load exceeds the second threshold.

9. The method of claim 8, wherein at least one of the main compressor and the auxiliary compressor is operated based on the electronics thermal load.

10. The method of claim 8, wherein the main compressor and the auxiliary compressor are operated at the same speed.

11. The method of claim 8, wherein the auxiliary compressor remains off until the overall thermal load exceeds a first cooling capacity of the multi-compressor refrigerant system.

12. The method of claim 11, wherein the first cooling capacity of the multi-compressor refrigerant system is based on the main compressor operating at a speed relating to a maximum efficiency of the main compressor and the auxiliary compressor is off.

13. A vehicle including a multi-compressor refrigerant system comprising:
- a refrigerant loop comprising a chiller loop and an evaporator loop fluidly coupled in parallel with the chiller loop, wherein the chiller loop comprises a chiller and the evaporator loop comprises an evaporator;
- a main compressor fluidly coupled with the refrigerant loop;
- an auxiliary compressor fluidly coupled with the refrigerant loop, wherein the main compressor and the auxiliary compressor are fluidly coupled in parallel; and
- a controller determining an overall thermal load place on the multi-compressor refrigerant system, wherein the overall thermal load comprises a climate thermal load of a passenger compartment in the vehicle and an electronics thermal load, and controlling the main compressor and the auxiliary compressor to satisfy the overall thermal load, wherein the controller operates only the main compressor when the thermal load is less than a first threshold, operates the main and auxiliary compressors at or below a maximum efficiency when the thermal load is between the first threshold and a greater second threshold, and operates the main and auxiliary compressors at or above the maximum efficiency when the thermal load exceeds the second threshold.

14. The vehicle of claim 13, further comprising a heater loop configured to exchange heat with the refrigerant loop by way of a water-cooled condenser.

15. The vehicle of claim 13, wherein the main compressor and the auxiliary compressor are each independently controllable.

16. The vehicle of claim 15, wherein the auxiliary compressor is configured to remain off until an overall thermal load exceeds a first cooling capacity of the multi-compressor refrigerant system.

17. The vehicle of claim 16, wherein the first cooling capacity of the multi-compressor refrigerant system is based on the main compressor operating at a speed relating to a maximum efficiency of the main compressor and the auxiliary compressor remaining off.

18. The vehicle of claim 13, wherein the main compressor and the auxiliary compressor are configured to operate simultaneously at the same speed.

19. The method of claim 8, wherein the main compressor and the auxiliary compressor are fluidly coupled in parallel.

* * * * *